United States Patent
Amarnath et al.

(10) Patent No.: US 7,321,983 B2
(45) Date of Patent: Jan. 22, 2008

(54) EVENT SENSING AND META-ROUTING PROCESS AUTOMATION

(75) Inventors: Rohit Amarnath, Jersey City, NJ (US); Vladimir Ivanov, Ossining, NY (US)

(73) Assignee: Traverse Systems LLC, Brooklyn, NJ (US)

( * ) Notice: Subject to any disclaimer, the term of this patent is extended or adjusted under 35 U.S.C. 154(b) by 388 days.

(21) Appl. No.: 10/783,240

(22) Filed: Feb. 20, 2004

(65) Prior Publication Data
US 2005/0144503 A1    Jun. 30, 2005

Related U.S. Application Data

(60) Provisional application No. 60/527,826, filed on Dec. 9, 2003.

(51) Int. Cl.
*G06F 11/00* (2006.01)
(52) U.S. Cl. ...................................................... 714/4
(58) Field of Classification Search .................... 714/4; 718/102, 103, 104
See application file for complete search history.

(56) References Cited

U.S. PATENT DOCUMENTS

| | | | | |
|---|---|---|---|---|
| 5,617,214 A * | 4/1997 | Webster et al. | ............. | 358/296 |
| 5,832,196 A * | 11/1998 | Croslin et al. | ................. | 714/4 |
| 6,101,180 A * | 8/2000 | Donahue et al. | ............ | 370/352 |
| 6,115,646 A * | 9/2000 | Fiszman et al. | ............ | 700/181 |
| 6,363,353 B1 * | 3/2002 | Chen | ......................... | 705/10 |
| 6,618,820 B1 * | 9/2003 | Krum | ......................... | 714/13 |
| 6,671,818 B1 * | 12/2003 | Mikurak | ........................ | 714/4 |
| 7,003,560 B1 * | 2/2006 | Mullen et al. | ............. | 709/223 |
| 7,103,597 B2 * | 9/2006 | McGoveran | .................... | 707/8 |
| 2002/0099563 A1 * | 7/2002 | Adendorff et al. | ............. | 705/1 |
| 2004/0260590 A1 * | 12/2004 | Golani et al. | ................. | 705/8 |

* cited by examiner

*Primary Examiner*—Robert W Beausoliel
*Assistant Examiner*—Elmira Mehrmanesh
(74) *Attorney, Agent, or Firm*—Ditthavong Mori & Steiner PC

(57) ABSTRACT

A process automation system is described which includes a sense and response framework for receiving events in the process and initiating tasks in response to the received events. Execution of the scheduled tasks may in turn generate additional events that are received and responded to until all nodes in the flow have been completed.

19 Claims, 3 Drawing Sheets

EVENT SENSING AND META-ROUTING PROCESS AUTOMATION

RELATED APPLICATIONS

The present application claims the benefit of U.S. Provisional Patent Application Ser. No. 60/527,826 filed on Dec. 9, 2003, the contents of which are hereby incorporated by reference.

FIELD OF THE INVENTION

The present invention relates to process automation and more particularly to sense and response automation for managing data warehousing.

BACKGROUND OF THE INVENTION

Data warehousing, the collection and integration of large amounts of enterprise related information, is essential to generating reports for large enterprises. For example, analysts at an airline use such reports of ticket sales grouped by airport, day of week, and other criteria to determine which routes the airline should add or drop. Merchandizing analysts at a clothing company use reports of clothing sales by region and season to determine which stores need to be restocked with which items. These reports are based on data collected from many different sources, such as point-of-sale terminals, and aggregated into a large database, commonly called a "data warehouse." Once the relevant data has been amassed within the data warehouse, reports summarizing the data can be generated for companies to use.

The sources that feed information into the data warehouse, however, tend to be quite different from one another or "heterogeneous," and the process of delivering the information produced by a particular data source into the data warehouse is often specific to that particular data source. In small enterprises, it is often economically acceptable for the data to be loaded manually by an employee who formulates and executes the appropriate commands for converting the data into the proper format, moving the data into the proper location, and loading the data into the data warehouse. Larger enterprises, however, have so much data that an automated approach is more economically desirable. One common automated approach to loading data into a data warehouse is known as "job-based scheduling," which involves scripting and mainframe technology that has been initially developed more than 30 or 40 years ago.

With job-based scheduling, an information technology (IT) engineer creates scripts that are executed on a periodic basis (e.g. nightly at 4:00 a.m.) and that control, at a detailed level, how the data is loaded, based on the particular requirements and formats of the incoming data and data warehousing. For example, the script may include the appropriate platform-specific commands for renaming a file containing the incoming data, causing the file to be moved to an appropriate location (e.g. directory or folder) on the computer system for the data warehousing, running specific data conversion routines to put the file of incoming data into a format the data warehouse is capable of processing, and invoking the data warehouse-specific command to cause the data warehouse to load the reformatted file.

Moreover, each data source has its own formatting and may be refreshed (i.e., become available with new data) at different times and periodicities than those of other data sources. For example, one data source can generate new information hourly, while another is daily. As a result, job-based scheduling script writers must be able to personally account for the differing data formats and handle the asynchronicity of the arrival of the data at different times.

Handling these issues, however, requires much skill and careful coding with complex methods, such as blocking jobs, parent job handlers, and so forth. As mainframe and other large computing system age, the numbers of people competent to craft such job-scheduled scripts diminishes with every year. The logic to handle these issues is hard-coded into the various scripts that are performed by the job-based, and upgrading or adding new data sources and data warehouses often require extensive recoding efforts and additional expense and time.

Some extraction, transformation, and loading (ETL) systems have been developed to address these complexities, but these ETL systems are often invasive, requiring tight integration both data sources and the data warehousing systems supplied by specific vendors and are difficult to extend to other installations or to be used with systems supplied by other vendors.

SUMMARY OF THE INVENTION

There is a long-felt need for an asynchronous, non-invasive approach for automating the delivery of information from a variety of multiple data sources to a data warehouse. This and other needs are addressed by providing a sense-and-response framework that is capable of receiving events in the process (e.g. data refreshing and other changes in data stores) and initiating appropriate and specific tasks in response to the routed events. Execution of the scheduled tasks may in turn generate additional events that are sensed and responded to until the process reaches an end point, e.g., delivered to a reporting system.

In one embodiment, this process automation can be implemented as an application platform capable of handling platform heterogeneity (i.e., handling multiple environments), task heterogeneity (i.e., several genres of task services such as file, extraction, transformation, loading, and database services), and time heterogeneity (i.e., handling multiple handshake points and periodicities of data availability).

The non-invasive process automation provided by embodiments of the present invention can handle process automation both horizontally across different heterogeneous environments but also vertically across different granularity levels, which may include inter-stage (between two distinct logical stages), and intra-stage (several events within a logical stage), and intra-task (checking for specific values within data). Furthermore, the automation of the various heterogeneous tasks can be exposed in the user interface along with clearly identified system handshake points. This allows for the process automation to be visualized clearly.

In one implementation, methods for the sense-and-response framework can be coded using web-services and/or the JAVA™ programming language to provide internal extensibility and external handshaking. An orchestration editor can also be provided to allow the user to design the automated process in a flexible and intuitive manner. Furthermore, sophisticated control, monitoring, playback, and exception handling can be provided, so that users can replay and debug the process automation.

For example, one embodiment of the present includes a distributed system for process automation comprising a computer-readable medium, an event router component, a means to start component, a conductor component and distributed services agents. A memory, storage, or other computer-readable medium store a representation of the process as a plurality of nodes and a plurality of directed links, in which each node has a plurality of attributes, each directed link connect two of the nodes and represents the sequencing and possibly data dependency between the two of said nodes, and the nodes including start nodes. The event router component receives status transition events for said nodes and dispatching said events to said conductor and distributed services agents components. The means to start component produces 'ready2go' events for said plurality of start nodes. The conductor component handles 'ready2go' and 'completed' events by generating 'inprocess' events in response to 'ready2go' events and deciding when to produce additional 'ready2go' events for successor nodes in response to 'completed' events. The distributed services agent handling 'inprocess' events by performing application work and producing 'completed' or 'error' events.

This embodiment of the present invention represents advances over workflow systems implemented by the present inventors to automate processes involving human agents and machine components. For example, Ivanov (U.S. Pat. No. 5,706,452) describes a system in which the workflow process is represented using roles, stages, and directed links, with attributes associated to roles and stages. Advancement to the next review stage is done when a general criterion to finalize the stage is satisfied. In this embodiment, the workflow process is represented using nodes and directed links, and advancement to the next task is done when the "AND logic condition" is satisfied, in a sense and response manner.

As another example, a proprietary system built by Amarnath employed the concept of meta routing. The meta routes defined the allowed state transitions, but not within the sense and response framework that this embodiment uses. Furthermore, all tasks were executed from within the confines of a single database, as opposed to the distributed architecture of the present embodiment. Finally, implementations of the present embodiment include process based error handling.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for process automation are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Architectural Overview

Figure 1:
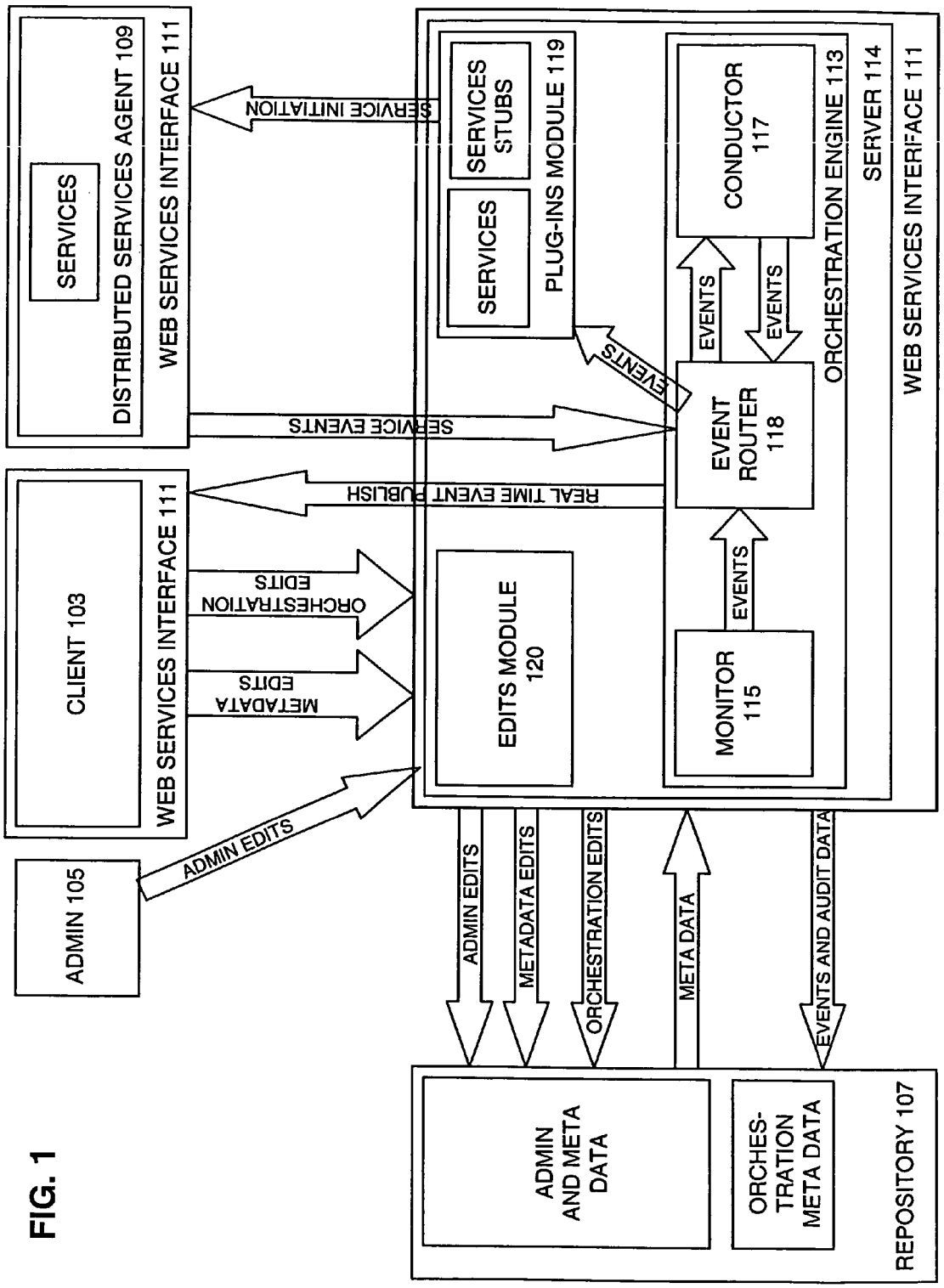
FIG. 1 is an architectural diagram of one embodiment of the present invention.

FIG. 1 is an architectural diagram of a process automation system according to one embodiment of the present invention. A core component of the process automation system is a server component 114, which communicates with other components to coordinate and perform the tasks and services for implementing an automated process. The other components, with which the server component 114 communicates, may include a client browser 103, an admin browser 105, a repository 107, and a distributed services agent 109.

The client browser 103 presents a graphical user interface (GUI) for allowing a user to create, edit, monitor, execute, and playback processes.

The admin browser 105 provides a browser-based management tool for viewing and updating the administrative data for the automated process and other configuration management information. The admin browser 105 may also provide security functions and allow for entry and modification of relatively static (e.g. long term) information about the automated processes being handled by the automation system.

The repository 107 includes a persistent, non-volatile memory such as a database or file system for storing the configuration information, metadata, and process logic for the automated processes as well as state information (including service events and orchestration edits).

Communication between the client 103 and server 114, and between the server 114 and the distributed services agent 109 takes place via a web services interface 111, which envelops each of the three components. In the preferred embodiment of this invention, the web services interface 111 provides the marshalling and un-marshalling of data that is being passed around, encryption of the data stream to ensure data security, and the actual transport.

The server component 114 includes different subsystems, among which an orchestration engine 113, an edits module 120, and a plug-ins module 119. These subsystems serve to encapsulate distinct functions of different parts of the process automation system.

The distributed services agent 109 is capable of spawning tasks to accomplish specific operations in a heterogeneous environment in response to service initiation messages received from the plug-ins module 119 of the server 114 component. A distributed services agent 109 may include modules for handling file services (e.g., deleting, concatenating, copying, renaming, moving files within a directory or file system), Structured Query Language (SQL) services (e.g., formulating and submitting relational database system commands, statements, and queries to a relational database or other implementation of the data warehouse and processing the results received in response), time services (e.g., scheduling completion of a process for a given time), operating system (OS) services (e.g., executing batch scripts), and analytic services (e.g. interfacing with a data analysis program such as ESSBASE™). Distributed services agents 109 may execute on different machines over a network. Service events generated from performing the various service tasks are transmitted back to the event router 118 within the orchestration engine 113 for further processing.

The orchestration engine 113 provides real time event publication to the client browser 103 for visualizing the execution of the process. This visualization allows the user to immediately grasp the state of the overall process. For example, currently executing events or tasks can be displayed as icons with a green background, while tasks with an error condition are shown with a red background.

The orchestration engine 113 communicates directly with the repository 107. This information may include metadata edits and auditing information to register within the repository 107 for storing metadata, entitlement, version, agent, and other relatively stable information. Shorter-term information, such as recorded service events and orchestration edits, may be kept in an orchestration repository component of the repository 107.

In one implementation, the orchestration engine 113 has three major components, a monitor 115, an event router 118, and a conductor 117. The monitor 115 is responsible for initiating the execution of a flow and performing housekeeping routines, such as checking if executing tasks are taking longer than the historical average for the respective tasks. The monitor 115 generates events which are then passed to the event router 118. In the preferred embodiment of this invention, the events are routed to the respective processors using a set of meta routes which do not depend on the topology of the process flow. The routes are static and depend only on the component types being assembled in a flow. The conductor 117 is the part that orchestrates the process flow. The conductor 117 receives events from the event router 118 and, in response, generates other events and delivers the generated events back to the event router 118. The event router 118 is the module that receives events from the monitor 115, the distributed services agent 109, and conductor 117, and dispatches the events to their handlers, namely the conductor 117, and plug-ins module 119. In turn, the plug-ins module 119 relays the event to the distributed services agent 109 as a service initiation request. When the invoked service completes or reports an error condition, it generates a service event which is delivered to the event router 118.

The orchestration engine 113 communicates real time events to all clients 103 that have subscribed to a particular set of events. It also saves the events and audit data to the repository 107.

A preferred embodiment of the process automation system implements various advanced features. One feature is domain separation and security entitlements, which allow processes to run in independent domains. For example, developers can have an individual sandbox for creating and testing new process flows independently of other developers. Within a given domain, only the latest version of a flow is active; all others are phased out as they complete. Different privileges and entitlements (for example, to create, monitor, and/or administrate different processes) can be assigned on a domain and/or user basis.

Side-by-side versioning is another feature that can be implemented with an embodiment of the present invention to allow modifications to existing process flows to be introduced into a production environment without affecting existing flows, thereby phasing in a version of the automated processes with little disruption.

Furthermore, specialized nodes can be provided to enhance the functionality of the system. For example, boundary nodes can be used to allow processes to have different periodicities on the same orchestration graph. Parameter feeder nodes can allow values to be fed into the process at any point.

Operational Overview

Figure 2:
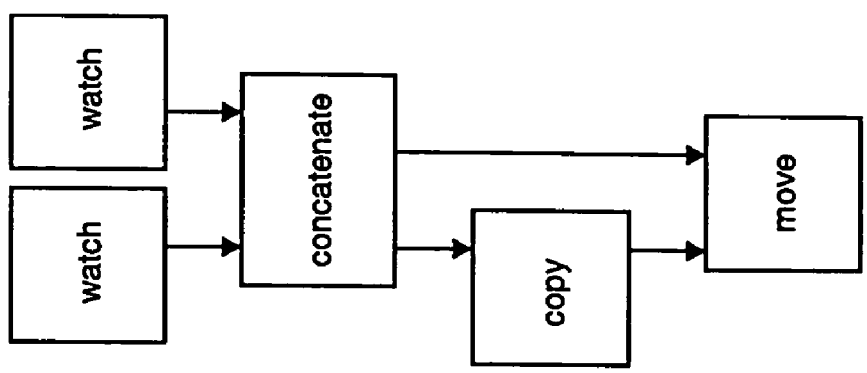
FIG. 2 presents a sample Directed Acyclic Graph (DAG) used to define flows processed by the method of this invention.

One implementation of the process automation system uses directed acyclic graphs (DAGs) to describe process flows (see FIG. 2). In such a process flow graph topology, a node describes a process and a link describes a dependency. The intrinsic semantics of such a structure, referred to as "the AND logic condition," is that a node can be executed if and only if all its predecessors have been successfully executed. Each node in the process flow graph has status information associated with it. One implementation of the process automation system uses the following statuses: 'notreached', 'ready2go', 'inprocess', 'completed', 'pseudocompleted', 'cached'/'blocked', 'error', 'warning'.

The events sensed and responded to include status changes in any of the nodes that are part of the process flow. The monitor 115 generates start events as follows: when there is no process that is active in a node section, the monitor 115 determines which nodes are the start or blocked nodes and changes the status of those nodes to 'ready2go' or 'inprocess' respectively, in effect starting or restarting the process flow. The conductor 117 is notified by the event router 118 of status changes to 'ready2go', 'completed', or 'pseudo-completed'. Upon receiving a 'ready2go' event, the conductor 117 generates an 'inprocess' event if the node is active, otherwise a 'completed' event.

'Inprocess' status changes (events) are received by the event router 118 and are routed to the plug-ins module 119, which contains a services stub for each type of node in the DAG. For example, a 'filewatch' node is handled by a 'filewatch' processor. An event handler processor can either process the service request locally or invoke the distributed services agent 109 to perform the actual work remotely.

Whenever there is an error in any node, the status of the node is changed to 'error'. Normally, the 'error' status is not changed automatically and a node can stay in this status indefinitely.

Nodes in a process flow can be tagged as boundary nodes. The set of boundary nodes define flow sections (slices). The semantics of a flow with two sections is that at any moment there can be two active instances of the process flow. The goal is to overlap time consuming operations to improve speed and the set of boundary nodes are used to compute these sections.

In order to enforce a "one flow instance active within a section at any time" constraint, when boundary nodes are reached, their status is changed to 'ready2go' if the next section is not active (there is no active node within the section). If the section is active then the new status of the boundary node is blocked (status is 'cached'). It is the responsibility of the monitor 115 to revive blocked nodes, that is, whenever the section has become inactive, to change the status of the boundary node to 'ready2go'.

Figure 3:
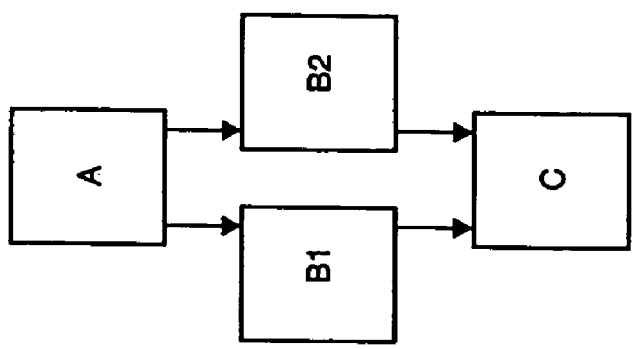
FIG. 3 presents the conditional execution of nodes.

The process automation system allows conditional execution of nodes. Upon evaluation of some condition, the process automation system decides whether to execute any of the successor nodes. To allow subsequent execution path convergence (see FIG. 2), nodes that are not executed because the condition was not met have their status changed immediately to 'pseudo-completed'. In FIG. 3, if the status of the non executed node B2 were not changed to 'pseudo-completed', node C would not be executed since in order to execute any node, all its predecessors would need to be 'completed'. Thus, in the AND logic condition statuses, 'completed' and 'pseudo-completed' are equivalent.

Each type of node in the process flow graph has a set of attributes associated with it. For example, a 'filewatch' node has an attribute named "agent" which specifies the (possibly remote) machine on which the file is being watched, "file" which specifies the full path and file name of the file being watched. The process automation system allows both the hard coding of attributes and substitution at run time. There is a special type of node which generates substitution parameters via various mechanisms (hard coded or by evaluating a database query).

Attributes of a node can be stored in the repository 107 as strings. Individual processors convert each attribute to its proper type before utilizing it. Prior to using an attribute, its expression is evaluated and all parameters are substituted. The parameters to be substituted are distinguished syntactically within the attribute string. One embodiment uses the syntax <%=parameterName %>. The parameters available to a node are all parameters that were produced by all nodes preceding the node. In case of a name clash, the value of the most recently computed parameter is used.

The process automation system allows the grouping of a node set into process sub-flows. Regular process sub-flows are similar to in-line routines from regular programming languages. They are defined once and used once at the location they are defined. Regular sub-flows are thus merely a way to better organize a process flow (e.g., for viewing purposes).

Subroutine sub-flows are defined in one place and can be used in many different locations. They are invoked via a special node ('subcall') which identifies the sub-flows to be invoked and the parameters to be passed. The 'subcall' node can invoke multiple subroutine sub-flows, and multiple instances of the same subroutine sub-flow at a time.

Finally, an error handler sub-flow is also defined in one place and can be used in many locations. The manner in which an error handler flow is invoked differs from a subroutine flow: when the status of a node changes to 'error' the name of one error handling flow is computed from the "err_handler" attribute and the respective flow is invoked. Upon completion of the error handling flow, one embodiment allows two strategies: (1) to consider the invoking node 'completed' and pass it a return code which in turn could be used in conditional links, and (2) to restart the flow from one or more predecessor nodes, resetting all statuses of intermediate nodes to 'notreached' and undoing all respective parameter bindings.

In order to prevent double entry of attribute values, the preferred embodiment allows one node to use attributes defined in predecessor nodes. For example, the 'file concatenate' node does not use attributes to specify which files should be concatenated. Rather, it uses the attributes in all predecessor 'file' nodes, in effect using the links not only as dependency links but as data links as well. However, in some circumstances one may desire to use a link only as a dependency link. The preferred embodiment of this invention adds the 'pass_data' attribute to a link to specify whether the link is a dependency only or a dependency and data link.

As a node is executed, its average execution time is monitored over all the iterations available in the repository.

At the node level, the flow designer can specify a percentage threshold $\Delta$ for the execution. If traditionally a node executes in X seconds and its current execution takes more than $(1+\Delta)^* X$ seconds then the node is flagged with an "Execution time exceeded historical limits" warning.

When a client 103 enables monitor mode, the client 103 registers itself with the orchestration engine 113 as a listener. From now until the client 103 no longer accepts events (either because the client 103 switched off monitor mode or because the user has closed the client 103), the orchestration engine 113 notifies the client 103 of any change in status events. The client changes the colors of the respective nodes and updates the run time attributes accordingly.

For both historical and operations reasons, events that occur in the process automation system are stored in the repository 107. This set of events is used in playback mode to visualize the execution of past events.

Discussion of the Process Automation Routines

Referring to the pseudocode in the appendix, routine TEAMonitor, which corresponds to the monitor 115 processor, is invoked periodically and performs the following functions: (1) for all nodes that are start nodes in the main flow check to see if the section that contains the node itself is already active. Include the node in the set of nodes checked. If false then activate the section via the node using a new run number and 'ready2go' as the new status. (2) for all nodes that are blocked (in other words, the execution prerequisite is met), but were blocked because the section was already active try to unblock them: if the section which contains the node (and excluding the node itself) is not active then activate the section by changing the status to 'ready2go' but use the blocked run number.

Routine TEAStarter, which is part of the conductor 117 processor, is invoked when the node status becomes 'ready2go' and performs the following functions: if the "hold" attribute of the node is TRUE then do nothing else if the "active" attribute of the node is TRUE then change the status of the node to 'inprocess', otherwise change the status to 'completed'. In both cases do not change the run number. Routine TEAStateMachine, also part of the conductor 117 processor, is invoked when the node status becomes 'completed' or 'pseudo-completed'. In turn, it tries to activate all node successors.

Routine tryToActivate has a node and a run number as input parameters. First, the tryToActivate routine determines the status into which the node would have to be activated, by calling activateToStatus. If the status to activate the node into is not 'dont_activate' then, if the node is not a boundary node then the status of node is changed to that status to activate into. If the node is a boundary node then, if the section that contains the node is already active then the node is blocked (change the status to 'cached' and the run number is not changed, but saved along with the potential status and run number for the unblock time. If the section is not active then the section is activated normally (via the node, with the status to activate into and the parameter run number). Routine activateToStatus takes the node and a run number as input parameters and has a default return value of 'pseudo-completed'. The predecessors of the node are evaluated using the "AND logic condition." If any predecessor has a status that is not 'completed' or 'pseudo-completed', then the node is not activated. Also, if there is a predecessor that is 'blocked' and the predecessor is linked with the node via a 'use_cached' link, then the node is not activated either. Otherwise, the status to activate into is either 'ready2go' or 'pseudo-completed' (default). If at least one predecessor via a regular link is 'completed', then the status to activate into is 'ready2go'. Also, if at least one predecessor via a conditional link is 'completed' and the condition criterion is met then the status to activate into is 'ready2go'.

Routine sectionIsActive takes a node and a boolean as parameters. It first computes the section that contains the node based on the boundary nodes. For performance reasons the sections may be computed when the flow is saved to the repository. If the set is empty then the section is not active. If the boolean indicates that the node itself should not be included in the set, then the node is excluded from the set. If all the nodes in the set are 'notreached' or 'cached' but not 'blocked' then the section is not active. If all the nodes in the set are 'completed' or 'pseudo-completed' the section in not active either. Otherwise the section is active.

Routine activateSection takes a node, a status, and a run number as parameters. If the run parameter indicates that a new run should be used, then a new run number is generated, and the activation status is set to 'ready2go'. If the run parameter indicates that the blocked run should be used, then the run number and the activation status are retrieved from the blocked record. Next, all nodes in the section are processed, the status of the node is changed to the activation status, and its run number is changed to the activation run number. The nodes in the section are processed as follows: nodes on the boundaries have status changed to 'cached' (the run number is not changed, the current status is saved, but the current run number is not—cached but not blocked); and internal nodes are cleared (status is changed to 'notreached', and the run number is cleared).

The activateSubInstance routine is part of the distributed services agent 109, more specifically of the 'subcall' processor. It simply activates all start nodes of that sub-flow with the specified instance number.

Hardware Overview

Figure 4:
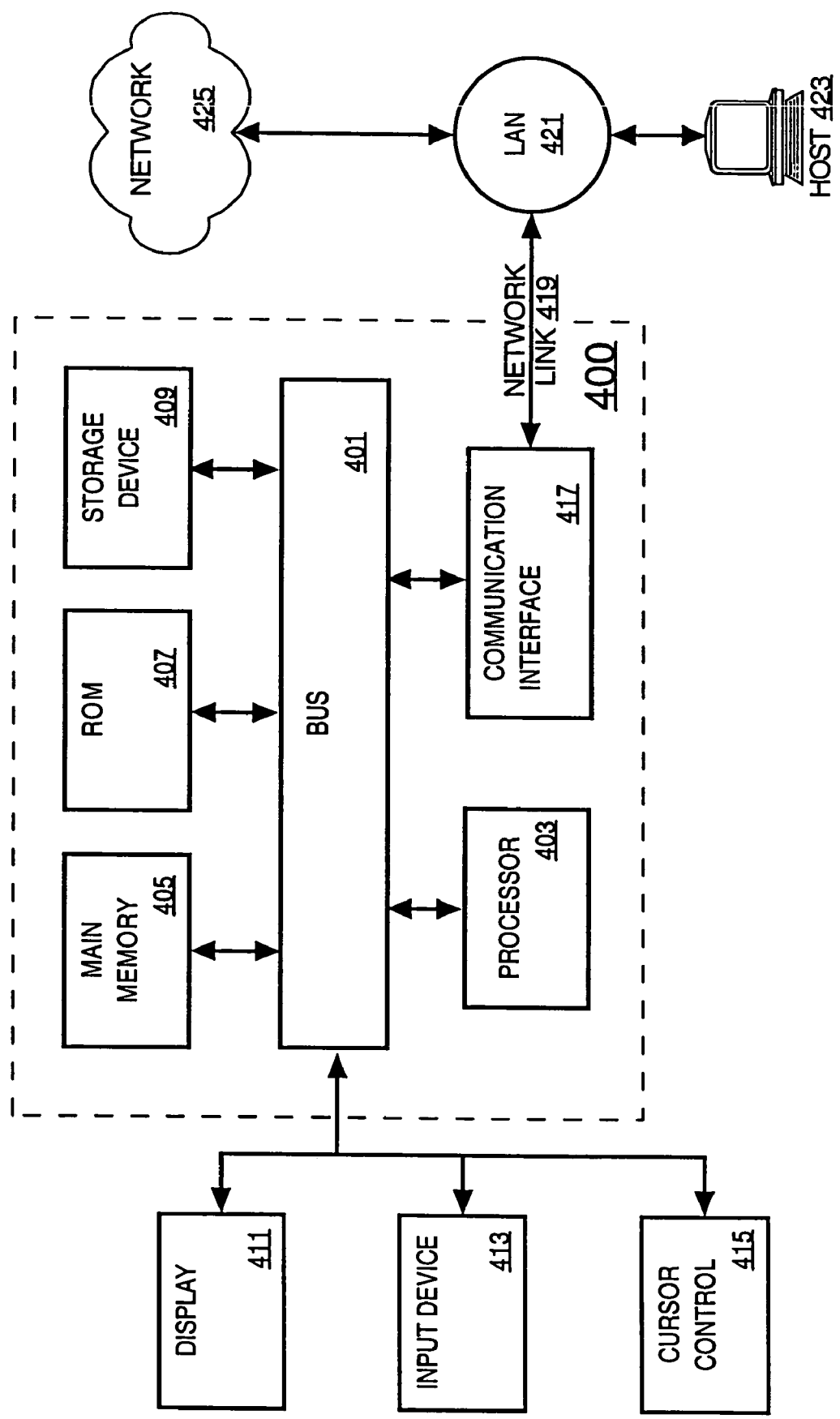
FIG. 4 depicts a computer system that can be used to implement an embodiment of the present invention.

FIG. 4 illustrates a computer system 400 upon which an embodiment according to the present invention can be implemented. The computer system 400 includes a bus 401 or other communication mechanism for communicating information and a processor 403 coupled to the bus 401 for processing information. The computer system 400 also includes main memory 405, such as a random access memory (RAM) or other dynamic storage device, coupled to the bus 401 for storing information and instructions to be executed by the processor 403. Main memory 405 can also be used for storing temporary variables or other intermediate information during execution of instructions by the processor 403. The computer system 400 may further include a read only memory (ROM) 407 or other static storage device coupled to the bus 401 for storing static information and instructions for the processor 403. A storage device 409, such as a magnetic disk or optical disk, is coupled to the bus 401 for persistently storing information and instructions.

The computer system 400 may be coupled via the bus 401 to a display 411, such as a cathode ray tube (CRT), liquid crystal display, active matrix display, or plasma display, for displaying information to a computer user. An input device 413, such as a keyboard including alphanumeric and other keys, is coupled to the bus 401 for communicating information and command selections to the processor 403. Another type of user input device is a cursor control 415, such as a mouse, a trackball, or cursor direction keys, for communicating direction information and command selections to the processor 403 and for controlling cursor movement on the display 411.

According to one embodiment of the invention, process automation is provided by the computer system 400 in response to the processor 403 executing an arrangement of instructions contained in main memory 405. Such instructions can be read into main memory 405 from another computer-readable medium, such as the storage device 409. Execution of the arrangement of instructions contained in main memory 405 causes the processor 403 to perform the process steps described herein. One or more processors in a multi-processing arrangement may also be employed to execute the instructions contained in main memory 405. In alternative embodiments, hard-wired circuitry may be used in place of or in combination with software instructions to implement the embodiment of the present invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the present invention are not limited to any specific combination of hardware circuitry and software.

The computer system 400 also includes a communication interface 417 coupled to bus 401. The communication interface 417 provides a two-way data communication coupling to a network link 419 connected to a local network 421. For example, the communication interface 417 may be a digital subscriber line (DSL) card or modem, an integrated services digital network (ISDN) card, a cable modem, a telephone modem, or any other communication interface to provide a data communication connection to a corresponding type of communication line. As another example, communication interface 417 may be a local area network (LAN) card (e.g. for Ethernet™ or an Asynchronous Transfer Model (ATM) network) to provide a data communication connection to a compatible LAN. Wireless links can also be implemented. In any such implementation, communication interface 417 sends and receives electrical, electromagnetic, or optical signals that carry digital data streams representing various types of information. Further, the communication interface 417 can include peripheral interface devices, such as a Universal Serial Bus (USB) interface, a PCMCIA (Personal Computer Memory Card International Association) interface, etc. Although a single communication interface 417 is depicted in FIG. 4, multiple communication interfaces can also be employed.

The network link 419 typically provides data communication through one or more networks to other data devices. For example, the network link 419 may provide a connection through local network 421 to a host computer 423, which has connectivity to a network 425 (e.g. a wide area network (WAN) or the global packet data communication network now commonly referred to as the "Internet") or to data equipment operated by a service provider. The local network 421 and the network 425 both use electrical, electromagnetic, or optical signals to convey information and instructions. The signals through the various networks and the signals on the network link 419 and through the communication interface 417, which communicate digital data with the computer system 400, are exemplary forms of carrier waves bearing the information and instructions.

The computer system 400 can send messages and receive data, including program code, through the network(s), the network link 419, and the communication interface 417. In the Internet example, a server (not shown) might transmit requested code belonging to an application program for implementing an embodiment of the present invention through the network 425, the local network 421 and the communication interface 417. The processor 403 may execute the transmitted code while being received and/or store the code in the storage device 409, or other non-volatile storage for later execution. In this manner, the computer system 400 may obtain application code in the form of a carrier wave.

The term "computer-readable medium" as used herein refers to any medium that participates in providing instructions to the processor 405 for execution. Such a medium may take many forms, including but not limited to non-volatile media, volatile media, and transmission media. Non-volatile media include, for example, optical or magnetic disks, such as the storage device 409. Volatile media include dynamic memory, such as main memory 405. Transmission media include coaxial cables, copper wire and fiber optics, including the wires that comprise the bus 401. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

PSEUDOCODE APPENDIX

```
TEAMonitor // invoked periodically
----------------------------------
begin
    forall (node) in StartNodesSet(null) do // top level start nodes only
        if not sectionIsActive(node, TRUE) then activateSection(node, ", USE_NEW)
    end forall
    forall (node) in BlockedNodesSet( ) do
        if not sectionIsActive(node, FALSE) then activateSection(node, ", USE_BLOCKED)
    end forall
end
TEAStarter(node) // invoked when node.status becomes READY2GO
-----------------------------------------------------------
begin
    if not node.hold then
        if node.active then saveStatus(node, 'INPROCESS', RUN_DONT_CHANGE,
node.status, node.run)
        else saveStatus(node, 'COMPLETED', RUN_DONT_CHANGE, node.status, node.run)
        end if
    end
activateSubInstance(caller, instance, run, pars) // invoked when a SUBFLOW node is
executed
--------------------------------------------------------------------------------
begin
    forall start in StartNodesSet(caller, instance) do
        activateSection(start, 'READY2GO', run)
    end forall
end
TEAStateMachine(node, run) // invoked when node.status becomes 'COMPLETED' or
'PSEUDO-COMPLETED'
------------------------------------------------------------------------------
begin
    forall successor in Successors(node) do
        tryToActivate(successor, run)
    end forall
end
activateSection(node, sta, run)
-------------------------------
begin
    if run==USE_NEW then run = newRun( ); sta = 'READY2GO'
    if run==USE_BLOCKED then run = blockedRun(node); sta = blockedSta(node)
    forall sec_node in Section(node) − {node} do
        if node.status != " and sec_node.isBoundary then
            saveStatus(sec_node, 'CACHED', RUN_DONT_CHANGE, sta, RUN_CLEAR)
        else
```

```
        saveStatus(sec_node. ", RUN_CLEAR, STA_CLEAR, RUN_CLEAR)
    end forall
    saveStatus(node, sta, run, STA_CLEAR, RUN_CLEAR)
end
sectionIsActive(node, includeNode)
---------------------------------
begin
    set = Section(node)
    if set == NULL then return FALSE
    if not includeNode then set = set - {node}
        if set == NULL then return FALSE
    if all nodes in set are ('' or ('CACHED' but not blocked)) then return FALSE
    if all nodes in set are 'COMPLETED' or 'PSEUDO-COMPLETED' then return FALSE
    return TRUE
end
tryToActivate(node, run)
------------------------
begin
    if (toStatus = activateToStatus(node, run)) != 'DONT_ACTIVATE' then
        if not isBoundaryNode(node) then
            saveStatus(node, toStatus, run, STA_CLEAR, RUN_CLEAR)
        else // node is a boundary node
            if sectionIsActive(node, FALSE) then
                saveStatus(node, 'CACHED', RUN_DONT_CHANGE, toStatus, run) // block
            else
                activateSection(node, toStatus, run)
            end if
        end if
    end if
end
activateToStatus(node, run)
---------------------------
begin
    toStatus = 'PSEUDO-COMPLETED'
    forall pred in Predecessors(node) do
        if not (pred.status = 'COMPLETED' or
                pred.status = 'PSEUDO-COMPLETED' or
                (pred.status = 'CACHED' and pred.link.flow_type = USE_CACHED)
            ) then return 'DONT_ACTIVATE'
        if pred.link_type = REGULAR then
            if pred.status = 'COMPLETED' then toStatus = 'READY2GO'
        else // pred.link_type = VALUE
            if pred(run).val = pred.link.val then toStatus = 'READY2GO'
        end if
    end forall
    return toStatus
end
```

CONCLUSION

While the present invention has been described in connection with a number of embodiments and implementations, the present invention is not limited but covers various obvious modifications and equivalent arrangements, which fall within the purview of the appended claims.

What is claimed is:

1. A distributed system for process automation comprising:
   a computer-readable medium configured to store a representation of the process as a plurality of nodes and a plurality of directed links, each said node having a plurality of attributes, each of said directed links connecting two of said nodes and representing the sequencing and possibly data dependency between the two of said nodes, said plurality of nodes including a plurality of start nodes;
   an event router component configured to receive status transition events for said nodes and dispatching said events to a conductor and distributed services agents components;
   means to start component for producing 'ready2go' events for said plurality of start nodes;
   said conductor component configured to handle 'ready2go' and 'completed' events by generating 'inprocess' events in response to 'ready2go' events and deciding when to produce additional 'ready2go' events for successor nodes in response to 'completed' events; and
   a distributed services agent configured to handle 'inprocess' events by performing application work and producing 'completed' or 'error' events,
   wherein said representation is configured to define non-overlapping sections of the process, and having at most as many active instances of the process as said non overlapping sections of the process,
   wherein each of said instances of the process having at most one non-overlapping section that has nodes in statuses other than 'notreached' or 'completed', and nodes in other sections in the same 'notreached' or 'completed' status.

2. The distributed system as recited in claim 1, wherein said representation is configured to specify cached data in a node, such that a successor node to said node starts execution further when the status of said node is 'notreached'.

3. The distributed system as recited in claim 1, further comprising said representation is configured to define sub-flows, and a means to invoke a plurality of instances of said sub-flows.

4. The distributed system as recited in claim 1, further comprising said representation is configured to define an error handling flow, and invoke one instance of said error handling flow when one node in said plurality of nodes receives an 'error' event.

5. The distributed system as recited in claim 1, further comprising a means to evaluate at run time said node attributes and using said evaluated attributes when performing said application work.

6. The distributed system as recited in claim 4, wherein said means to evaluate at run time said node attributes comprises computing parameters and having a means to handle parameter clashes.

7. The distributed system as recited in claim 1, further said representation is configured to specify conditional dependencies, and said conductor component recognize a 'pseudo-completed' event for nodes transitioned to via non satisfied said conditional dependencies.

8. The distributed system as recited in claim 1, further comprising a repository component that stores the event history, and a means to play back the process execution based on said event history.

9. The distributed system as recited in claim 1, further comprising a plurality of domains, wherein each of said domains has a plurality of processes out of which at most one is active at any time.

10. A method for dataflow automation in a system comprising a plurality of data management systems, comprising:
    storing a representation of the dataflow having a plurality of nodes and links, wherein each of the nodes corresponds to a process managing a portion of the dataflow in one of the data management systems, and each of the links connect two of the nodes and correspond to a dependency between two of the processes that correspond to the two of the nodes, wherein the data management systems are heterogeneous systems;
    sensing an event that occurs in one of the processes managing the dataflow in one of the data management systems, wherein the sensed event indicating whether the one of the processes has completed or has produced an error;
    in response to the sensed event, scheduling a task to manage data portion of the dataflow in another process in another of the data management system based whether events have been received indicating that predecessors for the other process indicated in the representation has completed or has produced an error;
    tagging some of the nodes in the representation as boundary nodes that define a plurality of sections of the dataflow, wherein the scheduled task is operating in one of the sections; and
    scheduling another task in another section of the dataflow, wherein the scheduled tasks and the other scheduled task are active at the same time.

11. A method for dataflow automation according to claim 10, further comprising:
    defining, in the representation, a subroutine of sub-flows that specifies a set of processes to be executed based on an invoking node; and executing the subroutine of sub-flows at an invoking node.

12. A method for dataflow automation according to claim 11, wherein the subroutine of sub-flows includes an error handler subroutine.

13. A method for dataflow automation according to claim 10, further comprising:
    storing an attribute for each node in the representation as a string that references one or more parameters produced by predecessor nodes of the node; and substituting the parameters in the attribute when invoking a process corresponding to the node.

14. A method for dataflow automation according to claim 13, further comprising:
    determining whether at least two of the predecessor nodes have produced a parameter with a same name; and selecting a value of the most recent parameter when at least two of the predecessor nodes have produced a parameter with a same name.

15. A method for dataflow automation according to claim 10, further comprising:
    selecting a successor process from among a plurality of successor processes at node to schedule based on a condition;
    scheduling a task for the selected successor process; and marking other of the successor process with one of a status indicating a completion.

16. A method for dataflow automation according to claim 10, further comprising:
    recording events and invocation of processes in a repository; and playing back the recorded events and invocation of processes.

17. A method for dataflow automation according to claim 10, further comprising:
    defining a plurality of domains; and executing a separate dataflow in each of the domains.

18. A computer-readable storage medium bearing instructions for dataflow automation, said instructions being arranged, upon execution by one or more processors, to perform the method according to claim 10.

19. A method of data processing, the method comprising:
    receiving information, corresponding to a process, from a plurality of heterogeneous data platforms; and
    providing a sense-and-response framework to process the received information, wherein the framework receives events in the process and initiates a plurality of heterogeneous tasks in response to the events, wherein the information define a plurality of sections, and one of the tasks is scheduled in one of the sections, and another one of the tasks is scheduled in another one of the sections, the scheduled tasks being active at the same time,
    wherein the tasks are executed until the process reaches an endpoint.

* * * * *